Sept. 18, 1951        G. F. DRAKE        2,568,226
PRESSURE RESPONSIVE DEVICE
Filed April 3, 1947
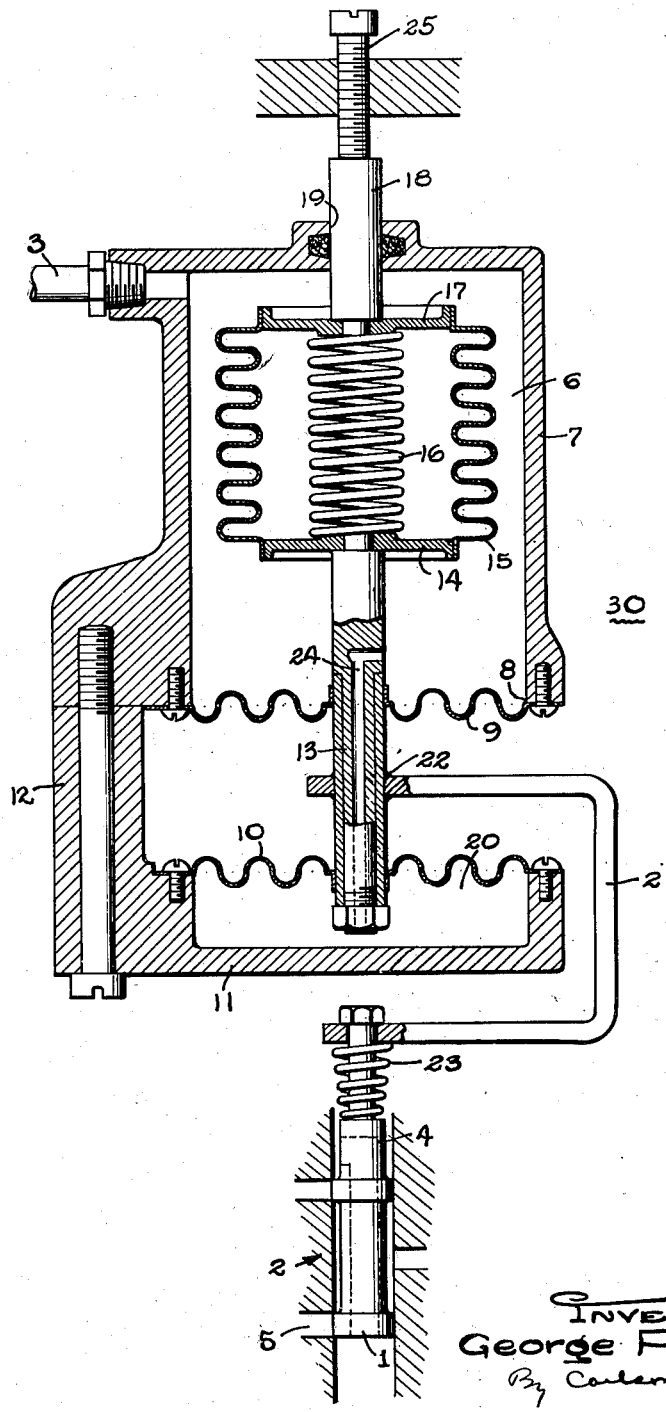
INVENTOR
George Forrest Drake
By Carlsem, Pitzner, Hubbard & Wolf
ATTORNEYS Patented Sept. 18, 1951

2,568,226

UNITED STATES PATENT OFFICE 2,568,226

PRESSURE RESPONSIVE DEVICE

George Forrest Drake, Rockford, Ill., assignor to Woodward Governor Company, Rockford, Ill., a corporation of Illinois Application April 3, 1947, Serial No. 739,052

4 Claims. (Cl. 137—156.5)

This invention relates to a seal for enabling a motion derived in a space at one pressure to be transmitted to and utilized in another space at a different pressure.

The primary object is to provide a seal of the above character in which the different pressures acting on the parts of the seal are completely balanced whereby to permit extremely small force changes to be transmitted mechanically from one space to the other.

A more detailed object is to transmit the control force from one space to the other through a flexible diaphragm wall on which all forces due to the pressure differences between the spaces are completely balanced.

Other objects and advantages of the invention will become apparent from the following detailed description taken in connection with the accompanying drawing which is a longitudinal cross-sectional view of a reciprocating type of fluid seal embodying the novel features of the invention.

For purposes of illustration, the drawing shows the improved seal as a means for enabling a control motion derived in a space 6 which is at one pressure to be transmitted mechanically to another space 30 at a different pressure and, in the latter space, applied to the movable element 1 of a control device such as a valve 2 shown as a land on a stem 4 coacting with a port 5 in a surrounding bore.

In this instance, the control motion is produced by pressure fluctuations transmitted to the chamber 6 through a passage 3 so that the illustrated assembly constitutes a pressure responsive relay. It will be understood, however, that this is only one of many possible uses for the improved seal.

The chamber 6 is defined by rigid walls 7 one of which has a circular opening 8 therein closed by an axially flexible diaphragm 9 clamped around its periphery against the defining wall of the opening. Axially spaced from the diaphragm 9 is a second similar diaphragm 10 of the same effective pressure area clamped against the end of a casing 11 which is supported by or otherwise fixed with respect to the casing 7 as by a rigid connection 12.

The centers of the axially spaced diaphragms are rigidly connected by a stem 13 which projects through the diaphragm 9 and into the chamber 6 and is exposed between the diaphragms for connection to the control element 1. Thus, the chamber is sealed effectually against fluid leakage therefrom but mechanical motion may be transmitted therefrom to the exterior space by axial flexing of the diaphragm, the scale of which does not vary the transmitted force appreciably for short motions.

Means is provided for balancing the pressure acting on the two diaphragms 9 and 10. For this purpose, the casing 11 supporting the diaphragm 10 defines a chamber 20 enclosing the outer side of the diaphragm and communicating with the chamber 6 through a passage 24. Herein, the latter extends lengthwise through the stem 13 and opens at opposite ends within the respective chambers. Since the diaphragms are exposed on adjacent sides to the space 30 and on remote sides to the chambers 6 and 20 which are at equal pressures, the pressure forces acting on the equally sized diaphragms will be balanced. All differential areas and rubbing friction are eliminated and the connecting member 13 will respond to very small changes in a control force applied to the latter at a point within the chamber 6.

While the control force may be derived from various sources, it is produced in the illustrated embodiment by pressure fluctuations in the pipe 3 which leads to the chamber 6. To measure these fluctuations, a pressure responsive device in the form of a closed evacuated bellows 15 is mounted within the chamber 6 with one end wall 14 connected rigidly to the inner end of the stem 13. The end walls of the bellows are separated and urged apart by a spring 16 and the other wall 17 is supported for axial movement so that the control point of the relay as a whole may be adjusted. This is accomplished herein by connecting the wall 17 to the end of a rod 18 which projects through and is guided at 19 in one wall of the chamber 6 in axial alinement with the stem 13. Any suitable means such as a screw 25 may be employed to adjust the rod 18 to different positions to thereby change the position of the normally fixed wall 17 of the bellows.

Externally of the chamber 6 and of the chamber 20 is a mechanical connection extending to the control element 1 to transmit to the latter the reciprocatory motion of the stem 13. Herein, this connection includes a rigid yoke 21 fixed at 22 to the stem 13 connected at the other end to the valve stem 4, the connection being through a spring 23 in the present instance.

For any given setting of the adjusting rod 18, it will be apparent that the valve element 1 will occupy a position corresponding precisely to the pressure prevailing in the chambers 6 and 20. Now, if the control pressure increases, the bellows 15 will collapse correspondingly, thereby moving the stem 13 and the valve element 1 upwardly. Conversely, in response to a drop in the control pressure, the bellows will expand axially thereby moving the valve element 1 downwardly.

I claim as my invention:

1. The combination of means defining a closed fluid chamber having one wall including an annular axially flexible diaphragm, said chamber being subjected to a variable pressure different from the pressure in the space surrounding the chamber a second diaphragm of the same effective area axially spaced from said first diaphragm and forming one wall of a closed chamber disposed on the side of the diaphragm opposite said first chamber, a stem rigidly connecting the centers of said diaphragms and projecting into said first chamber, means within one of said chambers for applying a control force to said stem variable in accordance with pressure changes in said variable pressure chamber, means establishing continuous communication between said chambers to equalize the pressures therein, and means connected to said stem externally of said chambers and adapted for connection with a device to be operated.

2. The combination of, means defining a closed fluid chamber subjected to a variable pressure different from that of the surrounding space and having a wall including an axially flexible diaphragm, a second diaphragm of the same effective area axially spaced from the first diaphragm and forming one wall of a second closed chamber disposed on the side of said second diaphragm remote from said first chamber, a member rigidly connecting said diaphragms, means establishing continuous communication between said chambers to equalize the pressures therein, means within one of said chambers for applying a control force to shift said member axially and varying in accordance with the pressure changes in said first chamber, and means disposed externally of said chambers for transmitting the axial movements of said diaphragms.

3. The combination of means defining a closed fluid chamber having one wall including a flexible diaphragm, the fluid pressures inside and outside of said chamber differing from and varying relative to each other, a second closed chamber having one wall closed by a flexible diaphragm of the same effective area as said first diaphragm, means establishing continuous communication between said chambers to equalize the fluid pressures therein, a device responsive to deviations of the pressure within the said first chamber relative to a predetermined pressure value and to apply to said diaphragm a force corresponding in magnitude and direction to such deviation, and means externally of said chambers rigidly connecting said diaphragms for flexure in unison.

4. A pressure balanced seal comprising two flexible diaphragms of equal effective areas, means rigidly connecting said diaphragms for flexing thereof in unison, and interconnected chambers defined in part by the respective diaphragms, the fluid pressures inside and outside of said chambers differing from and varying relative to each other, a device within one of said chambers for moving the diaphragm of such chamber in accordance with pressure changes within the chamber, the pressures in said chambers acting on said diaphragms to balance each other.

GEORGE FORREST DRAKE.

REFERENCES CITED

The following references are of record in the file of this patent:

UNITED STATES PATENTS

| Number | Name | Date |
|---|---|---|
| 2,042,523 | Graham | June 2, 1936 |
| 2,338,505 | Gregg | Jan. 4, 1944 |
| 2,365,650 | Shaw | Dec. 19, 1944 |
| 2,477,233 | Bristol | July 26, 1949 |